United States Patent [19]

Cheney

[11] 3,917,068

[45] Nov. 4, 1975

[54] DISC CARTRIDGE INCLUDING DRAW PLATE

[75] Inventor: George T. Cheney, Manchester, N.H.

[73] Assignee: Nashua Corporation, Nashua, N.H.

[22] Filed: July 19, 1974

[21] Appl. No.: 489,916

Related U.S. Application Data

[63] Continuation-in-part of Ser. No. 328,933, Feb. 2, 1973, abandoned.

[52] U.S. Cl. ........... 206/444; 220/251; 340/174.1 R

[51] Int. Cl.² .......................................... B65D 85/38

[58] Field of Search ......... 340/174.1 R, ; 301/9 DN; 206/303, 444, 818, 386; 29/159.01; 220/322, 324, 326, 251

[56] References Cited

UNITED STATES PATENTS

| | | | |
|---|---|---|---|
| 1,761,932 | 6/1930 | Nutt | 220/251 |
| 2,155,667 | 4/1939 | LeJeune | 301/9 DN |
| 2,424,106 | 7/1947 | Martens | 301/9 DN |
| 3,391,817 | 7/1968 | Shaw | 220/251 |
| 3,635,608 | 1/1972 | Crouch et al. | 206/444 |
| 3,753,490 | 8/1973 | Mowrey | 206/444 |

*Primary Examiner*—William I. Price
*Assistant Examiner*—Bruce H. Bernstein
*Attorney, Agent, or Firm*—Kenway & Jenney

[57] ABSTRACT

The tendency of circular draw plates used in disc cartridges containing a magnetic disc memory to warp during fabrication is significantly reduced by a draw plate which includes two warp reducing apertures each spaced at an angle of 90° from the posts along the circumference of said draw plate.

An improved post is disclosed. The post includes a coarse knurl which is urged into a post aperture formed in the draw plate.

A ring magnet in the bottom cover is also disclosed. The single ring magnet replaces several pot magnets of prior art cartridges and significantly reduces the cost of producing the disc cartridge.

20 Claims, 5 Drawing Figures

DISC CARTRIDGE INCLUDING DRAW PLATE

CROSS REFERENCE TO RELATED APPLICATION

This application is a continuation-in-part of U.S. Application Ser. No. 328,933 entitled Draw Plate and Disc Pack Including Draw Plate filed Feb. 2, 1973 and now abandoned.

BACKGROUND OF THE INVENTION

The field of the present invention is disc cartridges which include a magnetic memory disc. It is well known in the digital computer art to provide a digital computer with a memory system comprising a rotating magnetic disc positioned appropiately with respect to a magnetic recording and playback head.

A draw plate of the type to which the present invention is directed is shown by reference numeral 15 in West German Auslegeschrift No. 2,014,253, assigned to International Business Machines Corporation, Armonk, N.Y., the teachings of which are incorporated herein by reference. This draw plate is also shown by reference numeral 15 in British Patent Specification 1,200,572, the teachings of which are also incorporated herein by reference.

SUMMARY OF THE INVENTION

The problem of circular draw plates warping during fabrication is significantly reduced by the circular draw plate of the present invention which includes a pair of warp reducing apertures formed in the draw plate in a line with, and spaced apart from, the central aperture of the draw plate and located on an inner circumference of the circular disc a distance from the center of the draw plate which is equal to the distance that the posts are located from the center of the draw plate, with the warp reducing aperture being 90° of arc from the posts which secure the draw plate to the handle or cover of the disc cartridge.

In accordance with the present invention, the posts are maintained in the draw plate without bushings. To accomplish the foregoing, a coarse knurl on the post directly engages and forms a friction fit with the plastic material of the draw plate. This arrangement enables the posts to flex which facilitates assembly of the cartridge and reduces assembling costs.

A ring magnet in the bottom cover of the cartridge reduces the cost of producing disc cartridges.

Accordingly, it is among the objects of this invention to provide a new and improved magnetic memory disc cartridge.

Another object of the invention is to provide a new and improved draw plate for a disc cartridge which has a reduced tendency to warp as it is being fabricated.

Yet another object of the invention is to provide a draw plate with a pair of warp reducing apertures which reduce the tendency of the draw plate to warp during fabrication.

Yet another object of the present invention is to provide a draw plate having posts which flex.

Another object of the invention is to provide a disc cartridge in which a single ring magnet replaces several pot magnets.

DESCRIPTION OF THE PREFERRED EMBODIMENT

Figure 1:
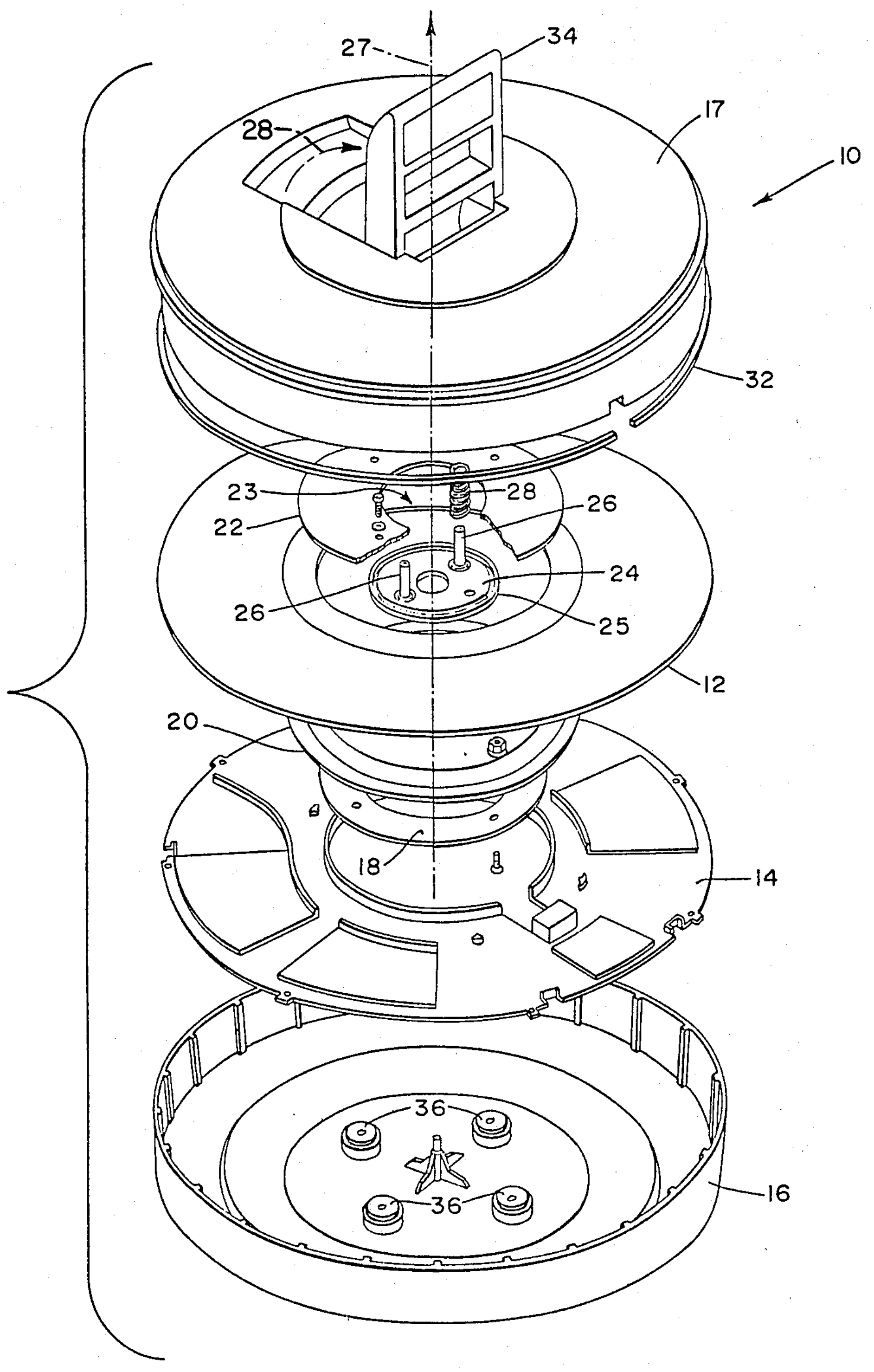
FIG. 1 PRIOR ART
FIG. 1 is an exploded perspective view showing a prior art disc cartridge including a prior art draw plate.

At the outset, a prior art disc cartridge assembly is briefly described in order to facilitate understanding the present invention. With reference to FIG. 1, a prior art disc cartridge assembly 10 is shown for housing a memory disc 12. The disc cartridge assembly 10 includes inside cover 14 to which is attached a bottom cover 16. A top cover 17 is also included which, together with bottom cover 16, covers memory disc 12. Memory disc 12 is secured to top cover 17 by an assembly which includes an armature plate 18, a hub 20, a clamp plate 22 and a draw plate 24. When assembled, armature plate 18 is secured to hub 20 with memory disc 12 securely clamped between hub 20 and clamp plate 22.

As is shown in FIG. 1, clamp plate 22 defines an aperture 23 which is of a sufficient size to allow the pair of draw plate posts 26 which are mounted on draw plate 24 to pass therethrough. Aperture 23, however, is also designed so that draw plate 24 is unable to pass therethrough when pulled upwardly in the direction shown by arrow 27. Thus, rim 25 of draw plate 24 forms a bearing which bears against the underside of clamp plate 22 when draw plate 24 is urged against clamp plate 22. As is also shown in FIG. 1, draw plate tension springs 28, are positioned around posts 26 with bushings (not shown) between the tension springs and the top cover. Top cover 17 is provided with a gasket 32.

With disc cartridges of the type shown in FIG. 1, posts 26 of draw plate 24 are secured to a handle assembly 34 of top cover 17. Although not shown in the drawing, suitable screws secure a lower member of the handle assembly 34 (a draw bar) to posts 26. As is apparent, with a disc cartridge assembled in the manner described above, an upward movement of the draw bar in handle assembly 34 will cause an upward movement of draw plate 24 which in turn will bear against the underside of clamp plate 22. Spring 28 normally urges the draw plate 24 away from the underside of clamp plate 22. With memory disc 12 clamped to clamp plate 22 as described above, the foregoing described displacement will cause a displacement of rotating assembly and top cover 17 out of bottom cover 16.

To secure the entire assembly when the disc pack is closed, bottom cover 16 is inclusive of magnets 36. Thus, magnets 36 attract armature plate 18 with a sufficient force to keep disc assembly 10 in tact or closed when desired. To open the disc cartridge, the force exerted by magnets 36 is easily overcome by rotating handle 34 in the direction shown by arrow 28. It should be noted that the details and operation of the disc cartridge shown in FIG. 1 are well understood in this art and form no part of the present invention.

Figure 2:
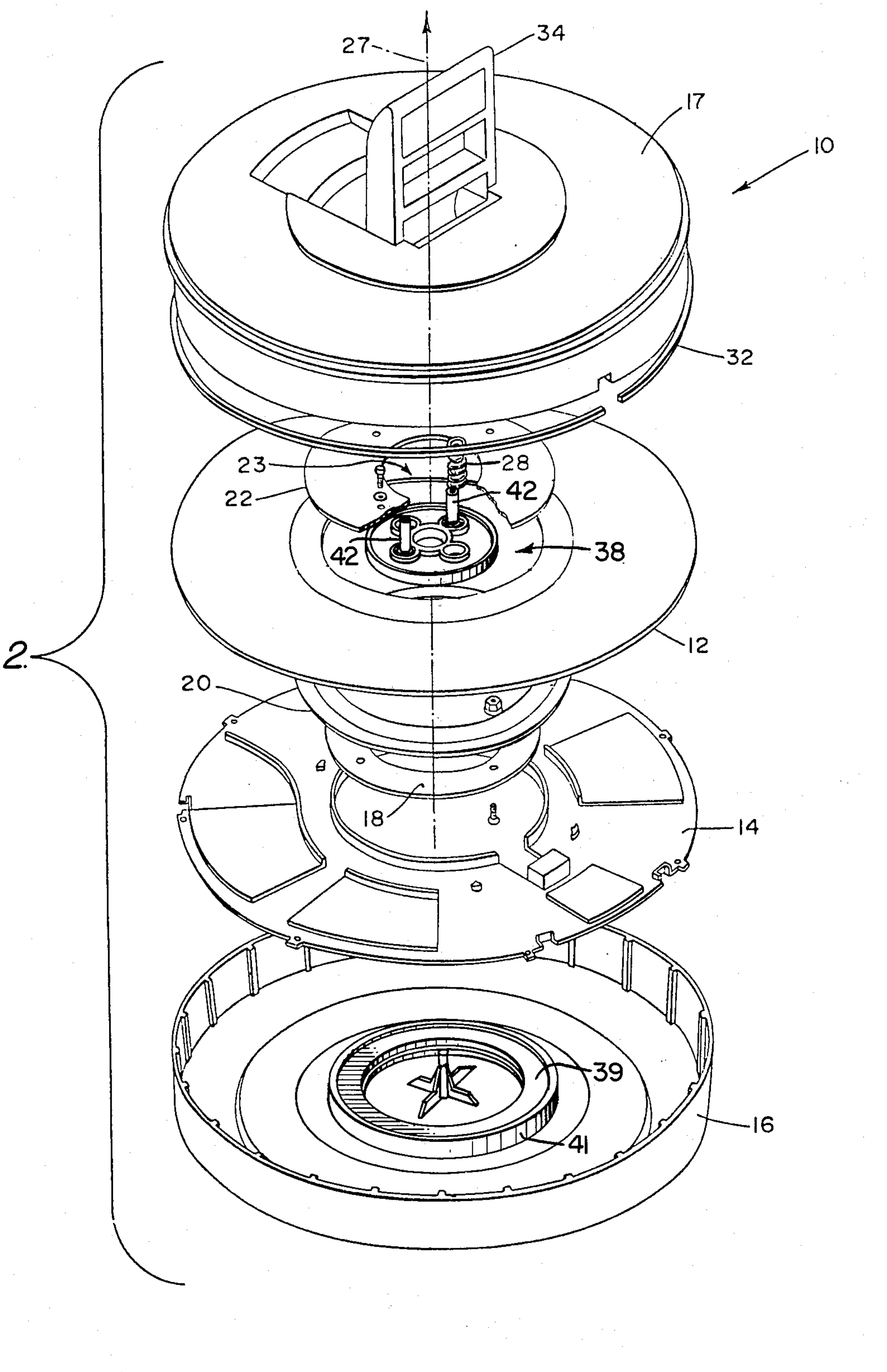
FIG. 2 is an exploded perspective view showing a disc cartridge in accordance with the present invention.

The disc cartridge of the present invention includes a draw plate with a reduced tendency to warp, as compared to prior art draw plates. The draw plate of the present invention also includes posts 42 which are novel because they are urged directly into the plastic material forming the draw plate. The cartridge of the present invention also includes a novel ring magnet 39 and a magnet cup 41. Since the disc cartridge assembly is similar to the assembly shown in FIG. 1, except for the draw plate, draw plate posts, ring magnets and ring cup, parts similar to the cartridge of FIG. 1 are given the same reference numerals in FIG. 2.

Figures 3, 4, 5:
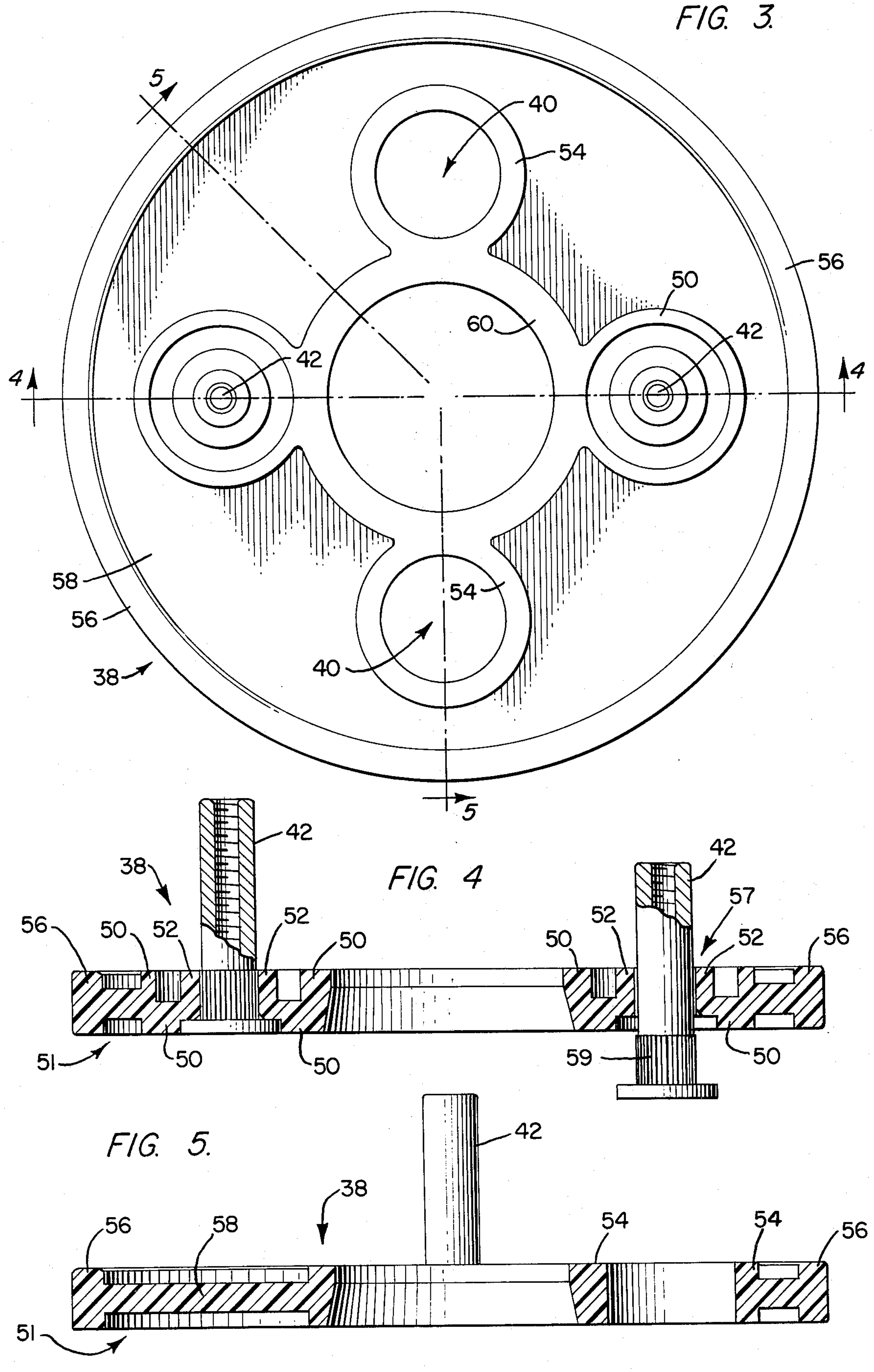
FIG. 3 is a top view of a draw plate taken from the assembly shown in FIG. 2.
FIG. 4 is a sectional view taken along line 4—4 of FIG. 3 with one post displaced downward.
FIG. 5 is a sectional view taken along line 5—5 of FIG. 3.

As is shown in FIG. 3, draw plate 38 of the present invention, has warp reducing apertures 40 formed therein. Although the precise reason is not completely understood, it has been found that molding draw plates with such apertures significantly reduces the tendency of the draw plate to warp during the molding process.

As is shown in FIGS. 3–5, each warp reducing aperture and post aperture is located an equal distance from the center of the circular draw plate. As is also shown in these figures, the draw plate is symmetrical. That is, the warp reducing apertures are located on a line and are separated by the central aperture, and the line connecting the centers of the warp reducing apertures is bisected at a 90° angle by a line connecting the centers of the post apertures which are also separated by the central aperture. Thus, each aperture is located on an inner circumference of the circular draw plate a distance of 90° of arc from adjacent apertures on this inner circumference.

As is also shown in FIGS. 3–5, the outer circumference of the draw plate is defined by a bearing rim 56. It is the upper side of bearing rim 56 that makes contact with clamp plate 22 when the draw plate is urged against the underside of clamp plate 22. In the preferred embodiment of the invention, all rims extend above and below the plane of body 58 of draw plate 38 an equal distance, as is shown in FIGS. 3 and 4.

It is preferable that the circumference of rims 54, which define the circumference of the warp reducing apertures 40, be approximately equal to the circumferences of bottom rims 50. It is also preferable that the rims 54, defining the warp reducing apertures, and bottom rims 50 make tangential contact with a central aperture rim 60.

It should be noted that the details of fabricating or molding draw plate in accordance with the present invention is well understood by those in this art. A suitable material for fabricating the draw plate is Delrin De–8010.

As is best shown in FIG. 4, the draw plate of the present invention includes posts 42. At this point it should be noted that a post in FIG. 4 has been displaced downward as an aid to understanding the invention. Of course an actual draw plate would look like draw plate 38 of FIG. 2. The post 42 of the present invention represents a significant improvement over the prior art post arrangement. With the draw plate 24 of the prior art cartridge, as shown in FIG. 1, posts 26 are secured to the draw plate 24 by screws (not shown) which protrude through a metal bushing (also not shown). The metal bushing in turn is positioned in a post aperture. This arrangement is more expensive than the post arrangement of the present invention and results in a draw plate with a distinct disadvantage. The prior art draw plate has posts which are rigid. This rigidity can present alignment problems when the posts are secured to the handle assembly.

With the draw plate of the present invention, the posts are inserted directly into post aperture 57. Post aperture 57 is formed of the plastic material from which the draw plate is manufactured. No bushing is required to secure the post 42 to the draw plate. As is best shown in FIG. 4, the bottom of post 42 contains a coarse knurl 59 which when forced into aperture 57 forms a friction fit with the draw plate. To form this friction fit the outside diameter of the coarse knurl is 0.265–0.275 in. and the inside diamter of the aperture 57 is 0.255 in.

As is set forth above, the post 42 of the present invention are not as rigid as the post on prior art draw plates. Indeed, they may be flexed slightly to enable them to be aligned with the handle assembly, if necessary.

As is shown in FIG. 3, post apertures 57 have outer flanges which are formed by bottom rims 50 on the bottom 51 of draw plate 38. Upper collars 52 form the upper portion of aperture 57.

Another advantage of the disc cartridge of the present invention over prior art disc cartridges is that a single ring magnet 39 replaces four separate magnets 36. It has been found that the single ring magnet works as efficiently as the four separate pot magnets. However, the cost of manufacturing the disc cartridge with a single ring magnet is significantly less than the cost of manufacturing cartridges with the four pot magnets. Ring magnet 39 is fabricated so that when the disc cartridge is closed, magnet 39 makes magnetic contact with armature plate 18. The ring magnet is housed in a magnetic ring magnet cup 41.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A circular draw plate for a disc cartridge of the type which has post apertures through which posts are secured to the draw plate and a pair of posts for engagement with a handle assembly on a cover of the disc cartridge wherein the improvement comprises a circular draw plate having a pair of warp reducing apertures, each of said warp reducing apertures and the post apertures being located an equal distance from the center of the circular draw plate and each warp reducing aperture being along an inner circumference of said circular draw plate at a distance of 90° of arc from a post aperture also located along said inner circumference.

2. The draw plate as set forth in claim 1 wherein said draw plate includes a central aperture centered between said warp reducing apertures and said post apertures.

3. The draw plate as set forth in claim 2 wherein said draw plate has an outer circular rim formed thereon.

4. The draw plate as set forth in claim 3 wherein said central aperture is defined by an inner circular rim.

5. The draw plate as set forth in claim 4 wherein said outer circular rim and said inner circular rim both extend above and below the plane of the body of the draw plate.

6. The draw plate as set forth in claim 5 wherein said post apertures are defined by circular rims and wherein said warp reducing apertures are also defined by circular rims which have a circumference approximately equal to the circular rims defining the post apertures.

7. The draw plate as set forth in claim 6 wherein said rims defining said warp reducing aperture and said rims defining said post apertures contact said rim defining said central aperture.

8. The draw plate as set forth in claim 1 wherein the bottom of the posts have a coarse knurl formed thereon which friction fits directly into a post aperture formed in the material from which the draw plate is fabricated, the direct fitting of said posts into the draw plate enabling the posts to be flexed to facilitate the alignment of the posts with the handle assembly.

9. The draw plate as set forth in claim 3 wherein the bottom of the posts have a coarse knurl formed thereon which friction fits directly into a post aperture formed in the material from which the draw plate is fabricated, the direct fitting of said posts into the draw plate enabling the posts to be flexed to facilitate the alignment of the posts with the handle assembly.

10. The draw plate as set forth in claim 7 wherein the bottom of the posts have a coarse knurl formed thereon which friction fits directly into a post aperture formed in the material from which the draw plate is fabricated, the direct fitting of said posts into the draw plate enabling the posts to be flexed to facilitate the alignment of the posts with the handle assembly.

11. A disc cartridge of the type which includes a memory disc covered by two covers, a top and a bottom cover, and a draw plate of a type which has post apertures through which posts are secured to the draw plate and a pair of posts for engagement with a handle assembly on one cover and which draws the memory disc toward one cover when the handle is rotated wherein the improvement comprises said draw plate having a pair of warp reducing apertures, each of said warp reducing apertures and the post apertures being located an equal distance from the center of the circular draw plate and each warp reducing aperture being along an inner circumference of said circular draw plate at a distance of 90° of arc from a post aperture also located along said inner circumference.

12. The draw plate as set forth in claim 11 wherein said draw plate includes a central aperture centered between said warp reducing apertures and said post apertures.

13. The draw plate as set forth in claim 12 wherein said draw plate has an outer circular rim formed thereon.

14. The draw plate as set forth in claim 13 wherein said central aperture is defined by an inner circular rim.

15. The draw plate as set forth in claim 14 wherein said outer circular rim and said inner circular rim both extend above and below the plane of the body of the draw plate.

16. The draw plate as set forth in claim 15 wherein the post apertures are defined by circular rims and wherein said warp reducing apertures are also defined by circular rims which have a circumference approximately equal to the rims defining said post apertures.

17. The draw plate as set forth in claim 16 wherein said rims defining said warp reducing aperture and said rims defining said post apertures contact said rim defining said central aperture.

18. The disc cartridge as set forth in claim 11 wherein the bottom of the posts have a coarse knurl formed thereon which friction fits directly into a post aperture formed in the material from which the draw plate is fabricated, the direct fitting of said posts into the draw plate enabling the posts to be flexed to facilitate the alignment of the posts with the handle assembly and wherein the bottom cover of the cartridge includes a ring magnet positioned on the inside thereof, said ring magnet making magnetic contact with an armature plate which is connected to said top cover to maintain said cartridge in a closed position.

19. The disc cartridge as set forth in claim 13 wherein the bottom of the posts have a coarse knurl formed thereon which friction fits directly into a post aperture formed in the material from which the draw plate is fabricated, the direct fitting of said posts into the draw plate enabling the posts to be flexed to facilitate the alignment of the posts with the handle assembly and wherein the bottom cover of the cartridge includes a ring magnet positioned on the inside thereof, said ring magnet making magnetic contact with an armature plate which is connected to said top cover to maintain said cartridge in a closed position.

20. The disc cartridge as set forth in claim 17 wherein the bottom of the posts have a coarse knurl formed thereon which friction fits directly into a post aperture formed in the material from which the draw plate is fabricated, the direct fitting of said posts into the draw plate enabling the posts to be flexed to facilitate the alignment of the posts with the handle assembly and wherein the bottom cover of the cartridge includes a ring magnet positioned on the inside thereof, said ring magnet making magnetic contact with an armature plate which is connected to said top cover to maintain said cartridge in a closed position.

* * * * *